US010378509B2

(12) United States Patent
Theis

(10) Patent No.: US 10,378,509 B2
(45) Date of Patent: Aug. 13, 2019

(54) TURBINE ROTOR FOR REDIRECTING FLUID FLOW INCLUDING SINUOUSLY SHAPED BLADES AND A SOLID CONICAL CENTER CORE

(71) Applicant: IAP, Inc., St. Paul, MN (US)

(72) Inventor: Michael R. Theis, Woodbury, MN (US)

(73) Assignee: IAP, Inc., St. Paul, MN (US)

( * ) Notice: Subject to any disclaimer, the term of this patent is extended or adjusted under 35 U.S.C. 154(b) by 0 days.

(21) Appl. No.: 15/726,701

(22) Filed: Oct. 6, 2017

(65) Prior Publication Data

US 2019/0195195 A1 Jun. 27, 2019

(51) Int. Cl.
*F03D 3/04* (2006.01)
*H02K 7/18* (2006.01)
*F03D 9/25* (2016.01)
*F03D 3/00* (2006.01)

(52) U.S. Cl.
CPC .......... *F03D 3/0427* (2013.01); *F03D 3/005* (2013.01); *F03D 9/25* (2016.05); *H02K 7/183* (2013.01)

(58) Field of Classification Search
CPC .......... F03D 3/00; F03D 3/0427; F03D 3/005; F03D 3/061; F03D 9/25; H02K 7/183
USPC ..... 290/44, 55; 415/2.1, 4.1, 4.2; 416/223 R
See application file for complete search history.

(56) References Cited

U.S. PATENT DOCUMENTS 335,388 A 2/1886 Serdinko
372,148 A 10/1887 Henderson
1,100,332 A 6/1914 Smith
1,519,447 A 12/1924 Fortier-Beaulieu
1,592,417 A 7/1926 Burke
4,017,205 A * 4/1977 Bolie .......................... F03D 1/04 415/208.2
4,018,543 A 4/1977 Carson et al.
4,070,131 A 1/1978 Yen
4,236,866 A * 12/1980 Zapata Martinez ...... F03D 3/02 415/4.4
4,309,146 A * 1/1982 Hein .......................... F03D 1/04 415/4.4

(Continued)

FOREIGN PATENT DOCUMENTS

WO WO 95/16858 6/1995

*Primary Examiner* — Tulsidas C Patel
*Assistant Examiner* — S. Mikailoff
(74) *Attorney, Agent, or Firm* — DeWitt LLP

(57) ABSTRACT

A fluid flow turbine having a turbine rotor with a plurality of blades (also known as "vanes") for converting the kinetic energy of a flowing fluid into mechanical rotational energy of the turbine rotor is provided by this invention. The plurality of blades are defined by a continuously sinuous curve outer edge that results in the lateral surface of the blades having a lower concave portion for scooping up the horizontal incoming fluid flow and redirecting it to a substantially vertical fluid flow along the lateral surface of the blade. The upper portion of the lateral surfaces of the blades is convex, causing the upper edge of the blades to tail off laterally so that the fluid flow exits the turbine in a substantially vertical direction, instead of turning back upon itself to reduces turbulence of the fluid flow inside the turbine. The fluid flow turbine can comprise a small wind turbine that will produce electrical power at low wind speeds, and can be mounted to the top of a building.

19 Claims, 6 Drawing Sheets

(56) References Cited

U.S. PATENT DOCUMENTS

| | | | | | |
|---|---|---|---|---|---|
| 4,418,880 | A * | 12/1983 | de Waal | B63H 7/00 | 244/199.1 |
| 4,428,717 | A * | 1/1984 | Catterfeld | F04D 7/04 | 29/889.4 |
| 4,508,973 | A | 4/1985 | Payne | | |
| 4,915,580 | A * | 4/1990 | Obidniak | F03D 1/00 | 415/2.1 |
| 5,381,048 | A * | 1/1995 | Baird | F03D 9/007 | 290/55 |
| 5,573,374 | A * | 11/1996 | Giberson | B23P 15/006 | 416/186 R |
| 6,302,778 | B1 * | 10/2001 | Andrews | F03D 3/005 | 454/16 |
| 6,428,275 | B1 * | 8/2002 | Jaakkola | F03D 3/005 | 416/176 |
| 7,040,859 | B2 | 5/2006 | Kane | | |
| 7,344,353 | B2 * | 3/2008 | Naskali | F03D 3/04 | 415/4.2 |
| 7,997,870 | B2 | 8/2011 | Neumann | | |
| 8,226,369 | B2 * | 7/2012 | Clark | F03D 1/0608 | 416/223 R |
| 8,360,713 | B2 * | 1/2013 | Carosi | F03D 3/02 | 415/4.2 |
| 8,598,751 | B2 * | 12/2013 | Lin | H02K 9/06 | 310/62 |
| D715,737 | S * | 10/2014 | Cooper | D13/115 | |
| 8,961,103 | B1 | 2/2015 | Wolff | | |
| 9,482,204 | B2 | 11/2016 | Plourde | | |
| 9,644,482 | B2 * | 5/2017 | Okayasu | F04D 29/023 | |
| 2004/0093727 | A1 * | 5/2004 | Mola | B23C 3/18 | 29/888.024 |
| 2005/0019165 | A1 * | 1/2005 | Fujimori | F04D 29/327 | 416/223 R |
| 2009/0257880 | A1 * | 10/2009 | Clark | F03D 1/0608 | 416/223 R |
| 2012/0061970 | A1 * | 3/2012 | Zivkovich | F03D 1/04 | 290/55 |
| 2012/0294739 | A1 * | 11/2012 | Nishimura | A47L 5/22 | 417/410.1 |
| 2013/0106193 | A1 * | 5/2013 | Bryson | F03D 9/007 | 307/73 |
| 2013/0263911 | A1 * | 10/2013 | Bryson | B60L 8/003 | 136/244 |
| 2014/0105751 | A1 * | 4/2014 | Okayasu | F04D 29/023 | 416/223 R |
| 2018/0010575 | A1 | 1/2018 | Kogan | | |

* cited by examiner

TURBINE ROTOR FOR REDIRECTING FLUID FLOW INCLUDING SINUOUSLY SHAPED BLADES AND A SOLID CONICAL CENTER CORE

FIELD OF THE INVENTION

This invention relates generally to turbine rotors that produce useful work from the flow of a moving gas or liquid, and more specifically to a turbine rotor having blades that interact with the gas or liquid flow to generate electricity, while redirecting the flow to enhance the efficiency of the electricity generation process.

BACKGROUND OF THE INVENTION

Wind power is becoming an increasingly accepted source of energy in the world. In part, this reflects the opportunity to convert the kinetic energy of blowing wind that is plentiful offshore and in some land-based regions into mechanical power via a wind turbine to a generator that produces electricity. In part, the demand for wind power is enhanced by government subsidies and regulations that favor a renewable energy source like wind that does not collaterally produce greenhouse gases or acid rain over conventional fossil fuels like coal, natural gas, and petroleum.

Indeed, in 2015 Denmark generated 40% of its electric power from wind with at least 83 other countries in the world contributing to their electric power grids via wind power. Wind power capacity expanded to 336 GW in 2014, representing approximately 4% of total worldwide electric power demand.

A windmill is a mill that converts the kinetic energy of the wind into mechanical rotational energy by means of vanes. Centuries ago, these vanes resembled sails that rotated in the wind and were operatively connected to millstones for grinding grain or pumps for drawing water. Modem windmills tend to comprise wind turbines with rotating metal blades used to generate electricity or pump water for land drainage or groundwater extraction.

Horizontal axis wind turbines ("HAWT") feature a tower with a fan-like rotor mounted at its top for rotation about a horizontal axis. Thus, the blades are rotated in a vertical plane by the wind. The rotor of a HAWT must face either into or away from the direction of the incoming wind, so a yaw mechanism is required to rotate the rotor about the vertical axis of the tower to maintain the rotor and its blades in proper alignment with the incoming wind flow. Since wind direction can frequently shift, the need for rotor redirection can be constant.

HAWT's are useful for capturing wind flows high above the ground level. Therefore, the towers are frequently very tall with blades that can exceed 330 feet in length. But, this tower must be structurally strong and robust to bear the weight of this rotor assembly, and resist oscillations caused by pressure pulsations produced by the blades interacting with the wind flow. Hence, while HAWT's are popular for production of wind power, they can be expensive to manufacture, install, and operate.

Vertical axis wind turbines ("VAWT"), by contrast, generally comprise a vertical shaft supporting a rotor assembly with blades that are rotated within a horizontal plane about a vertical axis by the incoming wind flow. The blades scoop up the horizontally flowing wind, which generally needs to be redirected to a more vertical flow to interact with the blades. Because the blades of such a rotor assembly turning about a vertical axis do not need to be specially aligned with the wind direction, there is no need for a yaw orientation mechanism and its associated power requirement. Thus, VAWT's are beneficial in locations where wind direction frequently shifts. They can be installed not only upon towers, but also upon the top of buildings and other structures. They can also interact with wind flows closer to the ground that are funneled by mesas, hill tops, and ridgelines. Finally, VAWT's generally have lower wind startup speed requirements compared with HAWT's with VAWT's being able to commence electricity production using wind flows at speeds as low as six miles per hour.

U.S. Pat. No. 335,388 issued to Serdinko in 1886 shows an early example of a HAWT. The blades rotate within a circular frame about a horizontal axis. A hemispheric domed roof protects the upper half of the blades from the incoming wind. A weather vane mounted to the top of the dome interacts with the incoming wind to turn the circular frame of the blade assembly in proper alignment with the wind without redirecting the wind flow within the turbine. A wing separately mounted to the dome detects overly strong winds to cause the blades to turn via some associated gears with their edges directed into the wind and stop rotating. A suspended weight reverses this process to reorient the blades with respect to the wind once it decreases to a safe speed.

By contrast, U.S. Pat. No. 1,100,332 issued to Smith in 1914 shows an early example of a VAWT. A rotor assembly having two sets of vanes positioned in a vertical plane is rotated about a vertical shaft by the incoming wind. The lower set is contained inside the rotor assembly. The upper set of vanes having a peculiar surface shape are secured at their bottom edges to the top of the rotor assembly, and at their top edges to a ring through which the rotor shaft extends. The blowing wind engages these top vanes to start the rotor assembly turning about the shaft where the wind interacts with the vanes mounted inside the rotor assembly to provide greater force to turn the rotor. But both sets of vanes merely catch the incoming wind flow without redirecting it inside the rotor assembly.

U.S. Pat. No. 1,592,417 issued to Burke discloses another VAWT in which spiral blades rotate around a vertical shaft to form a wind wheel assembly. The blades gradually decrease in width toward their lower ends to form a substantially frusto-conical shaped wheel. The frusto-conical shape of this resulting wind wheel tends to catch the incoming wind. Arcuate wings mounted to the periphery of the wind wheel provide surface area to direct the incoming wind into the openings of the wind wheel. However, the blades do not scoop or redirect the wind flow inside the wind wheel. Indeed, it appears from the drawings of the Burke patent that the rotating blades might cause the incoming wind flow to boomerang back upon itself. Thus, the arcuate wings are probably meant to overcome this turbulent air flow created by the rotating blades.

U.S. Pat. No. 372,148 issued to Henderson provides another early example of a VAWT windmill. The wind wheel containing a series of concave-shaped vanes is mounted about a vertical axis inside a rounded cone having only one side covered, so that the incoming wind flow is only permitted to bear against the vanes of one side of the wind wheel. This air flow bears against the concave surfaces of the vanes to rotate the wind wheel without being redirected inside the cone. Again, it appears that the wind flow may be turned back upon itself, which would cause turbulence.

U.S. Pat. No. 7,040,859 issued to Kane discloses a more recent example of a wind turbine. A series of vanes mounted to the bottom of a solid-topped cone comprises the turbine rotor. They revolve around a vertical axis as the incoming wind flow catches the surfaces of the vanes and then exits in a horizontal plane through the opposite side of the rotor. No updraft of the wind flow is created for the solid cone top prevents vertical outflow of the wind.

An alternative design for a VAWT is exemplified by U.S. Pat. No. 4,508,973 issued to Payne. The wind turbine comprises a housing with side inlets defined by a series of radial stationary vanes that join a conical, upwardly ramped floor to define passageways for the incoming wind flow. The conical floor surface creates an updraft for the wind flow as it travels through the passageways. The upwardly directed wind flows pulse against a propeller mounted to a vertical axis above the passageways. The wind flow exits through the top of the housing. The rotating propeller is operatively connected to a generator for producing electricity. See also U.S. Pat. No. 1,519,447 issued to Fortier-Beaulieu.

U.S. Pat. No. 4,018,543 issued to Carson et al. discloses a whirlwind power system in which a series of spirally-shaped stationary vane walls are mounted radially to the sides of a conical earthen mound. Like Payne and Fortier-Beaulieu, the incoming wind flows through the passageways directed upwardly by the ramped earth. The spiral vane walls create turbulence for the air flow to more actively turn a propeller mounted in the upper region of the structure on a vertical axis. U.S. Pat. No. 4,017,205 issued to Bolie adds a dome above the conical structure. The dome enhances the updraft of the airflow caused by the conical structure. See also U.S. Pat. No. 8,128,337 issued to Pezaris.

Other VAWT devices dependent upon an air updraft locate the propeller within the bottom portion of the device. For example, U.S. Pat. No. 4,070,131 issued to Yen shows a tornado-type wind turbine featuring a tower the walls of which comprise a series of movable vanes. Wind flows into the tower through openings in the side between the vanes. The vanes interact with the wind to create a vortex flow that moves in an upwards direction. The resulting updraft inside the tower draws wind through the bottom of the tower to rotate a propeller mounted on a vertical axis in the bottom portion of the tower.

U.S. Pat. No. 8,961,103 issued to Wolff discloses an omni-directional vertical axis wind turbine that can be mounted to the roof of a building. This is a large, complicated structure comprising a collector assembly with a series of inlet passages for collecting the incoming horizontal wind flow. The passages are defined by a series of stationary walls. The incoming air flows interact with a series of angled vertical panel members contained inside the collector assembly to redirect the air flow. These redirected air flows then interact with the incoming air flows to create a swirling stream of air flow inside the collector assembly. A stator assembly having a series of stationary angled vanes is mounted to the bottom of the collector assembly. Below the stator assembly is a turbine rotor mounted to a vertical axis. The swirling stream of airflow inside the collector assembly is directed downwardly by the vanes of the stator assembly to rotate the turbine rotor as the air flow exits the bottom of the structure.

Still other VAWT devices use horizontal airflow to turn a turbine rotor mounted to a vertical axis without vertical lift. Helically-shaped turbine blades are necessary for catching the airflow to turn the blades around the vertical axis. The air flow exits the opposite side of the structure. See U.S. Pat. No. 8,360,713 issued to Carosi et al., and U.S. Published Application 2012/10183407 filed by Vallejo. Carosi requires two turbine rotors having helically-shaped blades rotating in opposite directions about the vertical axis. U.S. Pat. No. 9,482,204 issued to Plourde et al. shows a wind turbine comprising three different sets of turbine rotors. The turbine blades rotating about the vertical axis feature flat vertical walls ending in a curved hook, thereby creating a high draft side and a low drag side along opposite sides of the blade to improve the horizontal airflows that bear against the turbine blades to rotate the rotors.

However, these VAWT's in the prior art have complicated structures with many moving parts. This necessarily increases the capital costs and operating costs for the VAWT. It would be beneficial to provide a vertical axis wind turbine of simpler design that can use the blades of the turbine rotor, itself, to redirect horizontal incoming air flow into vertical air flow that exits the turbine at or near the top, bearing against the blades of the turbine in the process to rotate the turbine about a vertical axis to produce electricity via an associated generator. There should be no need for separate turbine propellers or ramped surfaces inside the rotor separate from the turbine blades for creating vertical lift. By having the blades of the turbine rotor do all the work for redirecting the incoming air flow to create vertical air flow, the number of parts for the wind turbine can be significantly reduced.

SUMMARY OF THE INVENTION

A fluid flow turbine having a turbine rotor with a plurality of blades (also known as "vanes") for converting the kinetic energy of a flowing fluid into mechanical rotational energy of the turbine rotor is provided by this invention. The fluid flow turbine has a series of inlets along its side for admitting the entry of the fluid flow along a substantially horizontal axis. The plurality of blades having an edge and a lateral surface are attached to a base plate of the turbine rotor featuring a solid core, so that the fluid flow cannot pass horizontally through the turbine rotor, instead being fully engaged by the lateral surfaces of the blades. The edge surfaces are defined by a continuously sinuous curve. This results in the lateral surface of the blades having a lower concave portion for scooping up the horizontal fluid flow and redirecting it to a substantially vertical fluid flow along the lateral surface of the blade. The upper portion of the lateral surfaces of the blades is convex, causing the upper edge of the blades to tail off laterally so that the fluid flow exits the turbine in a substantially vertical direction, instead of turning back upon itself. This reduces turbulence of the fluid flow inside the turbine. As the fluid flow presses against the blades inside the turbine, the turbine rotor is turned about a vertical axis, producing mechanical rotational energy.

The lower portion of the blade preferably is inclined from the base plate at an angle of about 55-58 degrees, preferably about 56-57 for gaseous fluid flows, and an angle of about 42-60 degrees, preferably about 56-57 degrees for liquid fluid flows in order to produce the vertical lift of the fluid flow traveling along the top blade surface. The angle between the upper portion of the blade and the tailed off lateral portion of the blade is about 100-179 degrees, preferably about 120-160 degrees, more preferably about 149 degrees, to enhance the substantially vertical path of the fluid flow as it exits the turbine rotor.

The bottom edges of the blades contained inside the turbine rotor are preferably not positioned along the radii of the base plate. Instead, the bottom edges of the blades preferably lie along a chord across the base plate at an angle with respect to a radius line meeting a common point along the periphery of the base plate of about 0-20 degrees, preferably about 5-15 degrees, even more preferably about 12-13 degrees. By canting the blade towards the incoming fluid flow and way from its conventional radius position, the blades more efficiently catch the incoming fluid flow as it enters the turbine rotor to rotate the blades.

The turbine rotor also features an upper housing for securing the alignment of the blades contained therein. This upper housing may also bear an outwardly flared upper lip extending from its side wall that produces a constriction point inside the upper housing to reduce the static pressure around the outlet of the turbine rotor to enhance the flow of the fluid source through the turbine rotor.

The fluid flow turbine may be used in association with a moving gas or liquid stream existing in nature or an industrial process. For example, a gaseous stream may include moving wind in the air, or a moving gaseous effluent like flue gas, process steam, combusted hydroxides, nitrous oxides, or sulfur oxides produced by a combustion process in an industrial plant. A liquid stream may include for example, water flow in a river or ocean, or over a waterfall, or a liquid stream like a cooling tower coolant at a power plant.

The mechanical rotational energy produced by the interaction of the blades of the turbine rotor with the incoming fluid flow may be used to generate productive work, such as creating electricity via a generator, grinding cereal grains or other granular materials via one or more millstones, or creating a directed airstream for conveying a granular material. In particular, a very small wind turbine having a turbine rotor that is only 45-74 inches in diameter and 28-46 inches in height can readily generate electricity even at low wind speeds of 4 msec. Two kilowatts of power can be produced by wind blowing aton 11 msec.

DESCRIPTION OF THE PREFERRED EMBODIMENT

Figure 1:
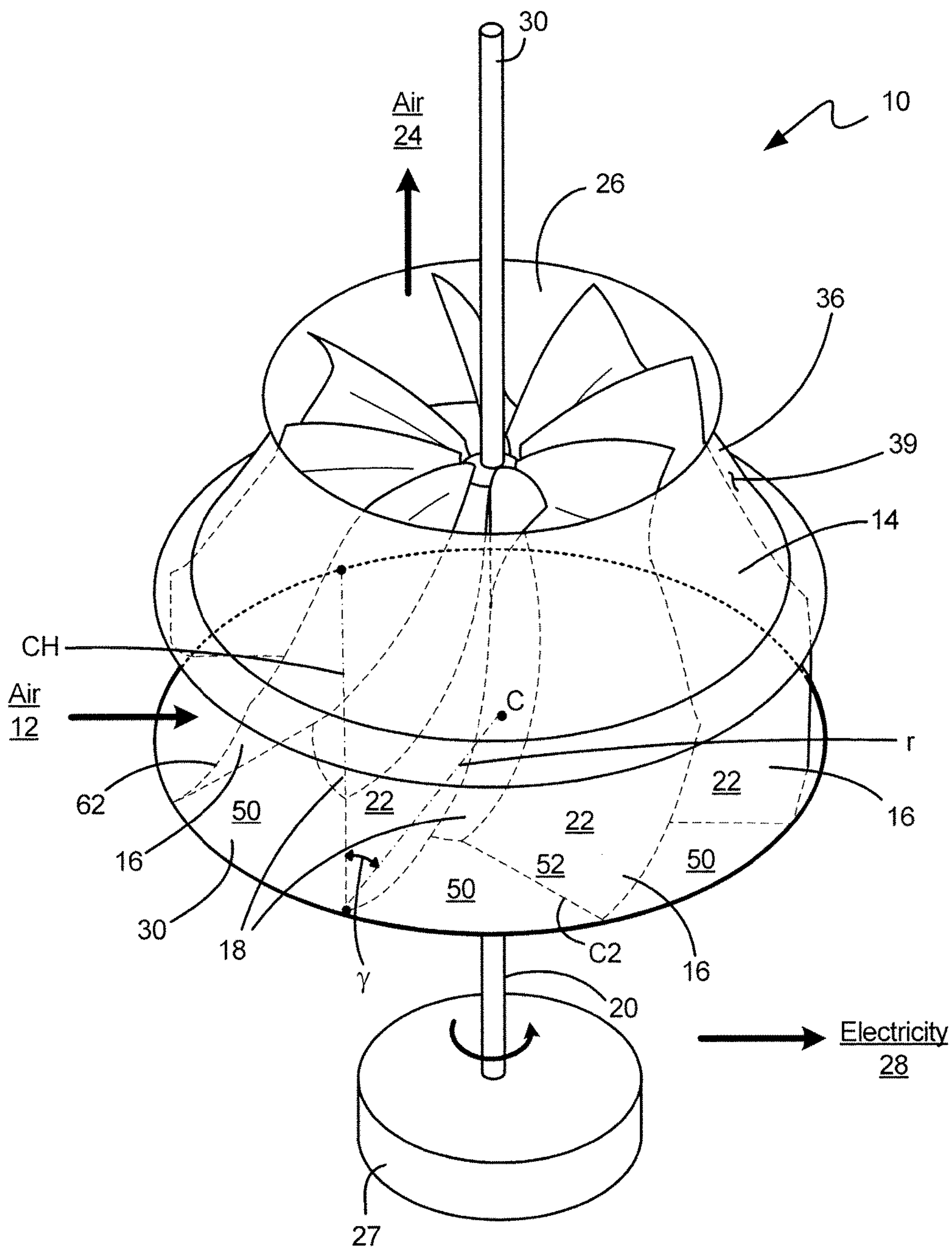
FIG. 1 represents a perspective view of the fluid flow turbine of the present invention.

A fluid flow turbine having a turbine rotor with a plurality of blades (also known as "vanes") for converting the kinetic energy of a flowing fluid into mechanical rotational energy of the turbine rotor is provided by this invention. The fluid flow turbine has a series of inlets along its side for admitting the entry of the fluid flow along a substantially horizontal axis. The plurality of blades having an edge and a lateral surface are attached to the turbine rotor featuring a solid core, so that the fluid flow cannot pass horizontally through the turbine rotor, instead being fully engaged by the lateral surfaces of the blades. The edge surfaces are defined by a continuously sinuous curve. This results in the lateral surface of the blades having a lower concave portion for scooping up the horizontal fluid flow and redirecting it to a substantially vertical fluid flow along the lateral surface of the blade. The upper portion of the lateral surfaces of the blades is convex, causing the upper edge of the blades to tail off laterally so that the fluid flow exits the turbine in a substantially vertical direction, instead of turning back upon itself. This reduces turbulence of the fluid flow inside the turbine.

As the fluid flow presses against the blades inside the turbine, the turbine rotor is turned about a vertical axis, producing mechanical rotational energy. This mechanical rotational energy may be used to generate productive work, such as creating electricity via a generator, grinding cereal grains or other granular materials via one or more millstones, or creating a directed airstream for conveying a granular material. The fluid flow that operates the turbine may comprise a moving gas like air, or a liquid like water contained in a river or ocean.

For purposes of this invention, "fluid" means a moving gas or liquid stream existing in nature or an industrial process. For example, a gaseous stream may include moving wind in the air, or a moving gaseous effluent like flue gas, process steam, combusted hydroxides, nitrous oxides, or sulfur oxides produced by a combustion process in an industrial plant. A liquid stream may include for example, water flow in a river or ocean, or over a waterfall, or a liquid stream like a cooling tower coolant at a power plant.

The term "productive work" means an industrial process for producing a useful product such as electricity via a generator; ground cereal grains or other granular organic or inorganic materials like biomass to reduce their particle size; or directed air streams for pneumatic conveyance of powders, dust, sawdust, woodchips, etc.

While the fluid medium associated with the fluid flow turbine of the present Application is described as comprising wind, the kinetic energy of which is converted into electricity via a generator operatively connected to the turbine, it should be understood that the invention is not limited thereto. It can be applied to a variety of fluid flow sources, and forms of productive work operated by the rotational mechanical energy output of the turbine rotor contained inside the turbine.

The fluid flow turbine 10 of the present invention is depicted in FIG. 1 where blowing air 12 is used as the motive kinetic energy source. The fluid flow turbine 10 comprises a turbine rotor 14 having a plurality of blades 16 extending radially outwards from its solid core center 18. The turbine rotor turns in a counterclockwise direction (as shown in FIG. 1) around a vertical axis A-A defined by a vertical shaft or rod 20 connected to the turbine rotor. The turbine rotor is propelled by means of the incoming air flow pressing against the lateral surfaces 22 of the blades 16. The outlet air flow 24 then exits the top of the turbine rotor 10 via outlet vent 26. The vertical shaft or rod 20 turned by the rotating turbine rotor is operatively connected to a generator 27 which converts the rotational mechanical energy of the turbine rotor 14 resulting from the kinetic energy contained in the incoming air flow 12 into electricity 28.

Figure 2:
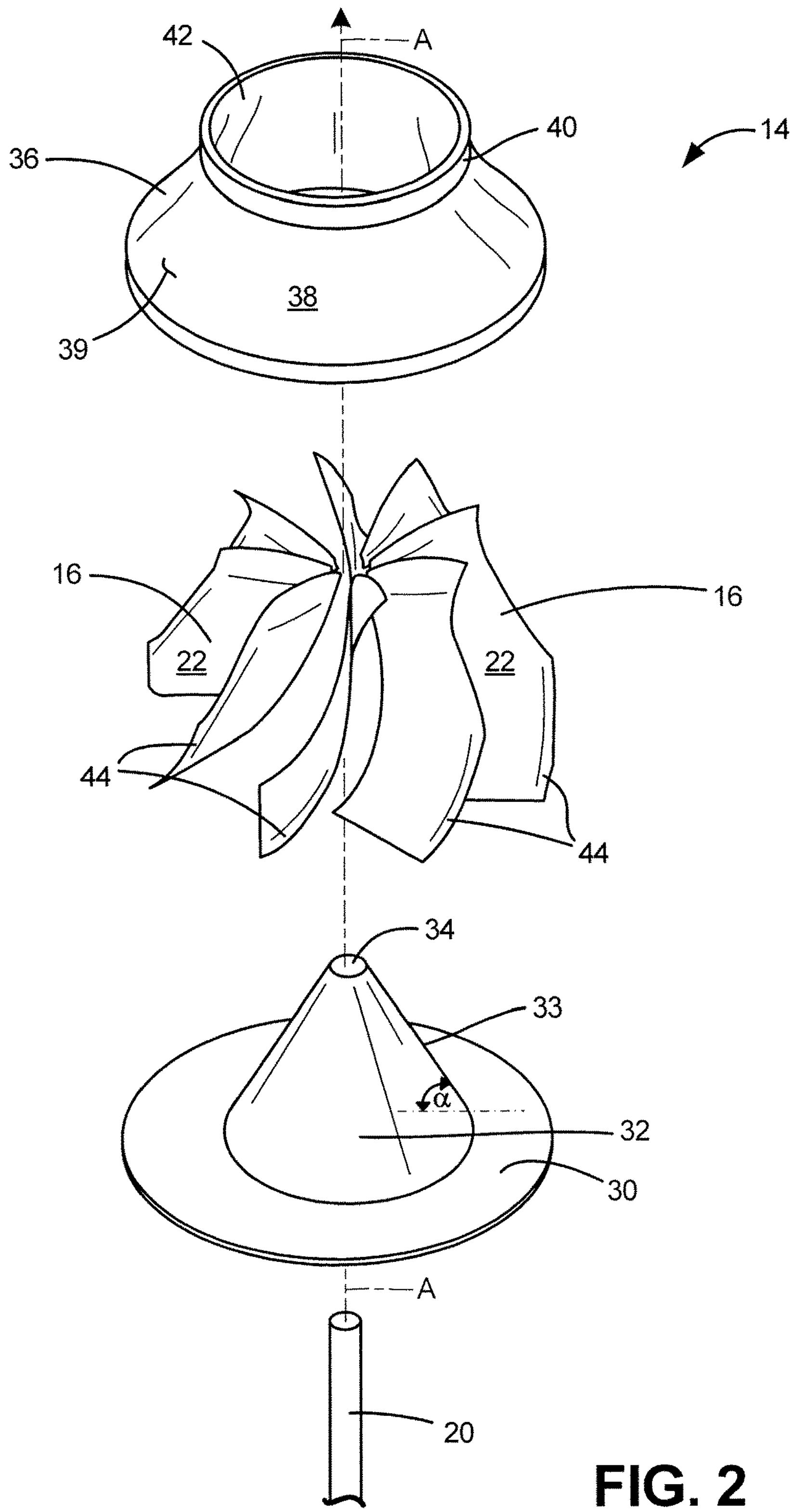
FIG. 2 represents an exploded view of the turbine rotor of the fluid flow turbine of FIG. 1.

The turbine rotor is depicted in an exploded state in FIG. 2. Base plate 30 comprises a relatively flat substrate that may be formed from any suitable shape such as a circle, ellipse, or square. Because the turbine rotor is rotated about the vertical axis A-A, a circular shape is preferred. Secured to the top surface of the base plate 30 is center core 32 having a solid wall that does not permit the fluid to pass through it. It provides a structural support for the plurality of blades 16 that are secured to the solid wall and will radiate from its outside surface. This solid center core 32 has a hollow interior containing a through hole 34 for accommodating the vertical shaft or rod 20. The solid center core may be formed from any suitable shape, such as a cone or cylinder. A cone is preferred. The angle $\alpha$ between the side wall 33 of the solid center core and base plate 30 should be about 64-67 degrees, preferably about 65-66° (see FIG. 2).

Upper housing 36 comprises a bell-shaped structure. It includes side wall 38, an upper lip 40, and an outlet 42. The upper lip 40 may be vertical or outwardly flared. The upper housing may have the outer edges 64 of blades 16 attached to its interior surface, such as by means of a weld. In this manner, upper housing 36 rotates with turbine rotor 14, and provides structural support to the blades 16. Alternatively, the upper housing 36 may remain stationary so that the blades 16 of the turbine rotor 14 rotate inside it.

Figure 3:
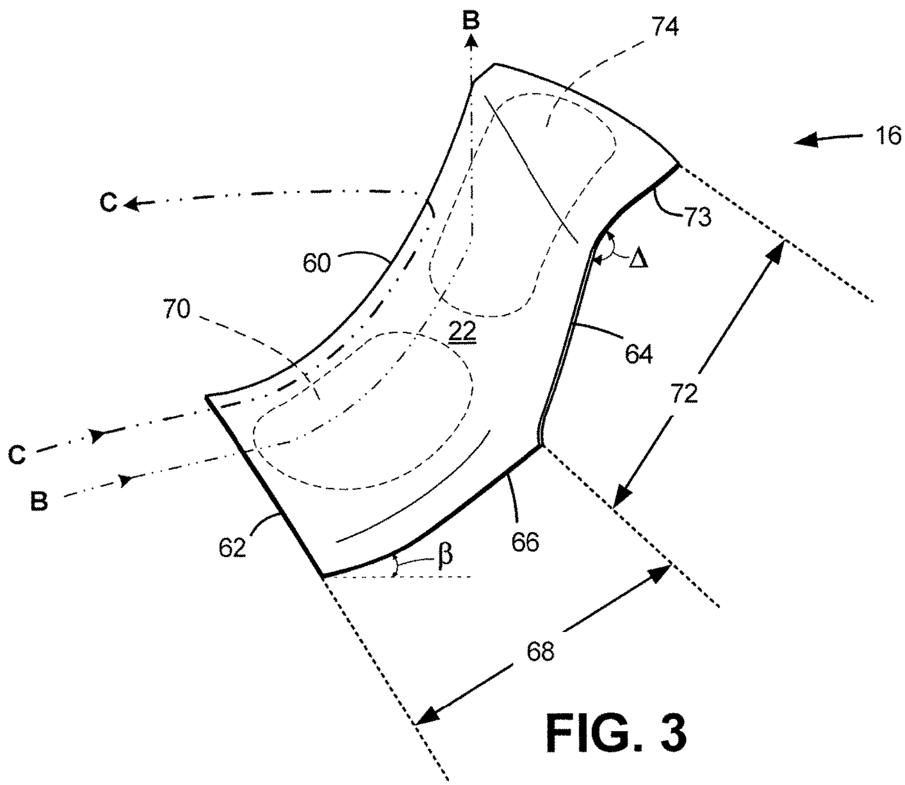
FIG. 3 represents a perspective view of a blade of the turbine rotor.
Figure 4:
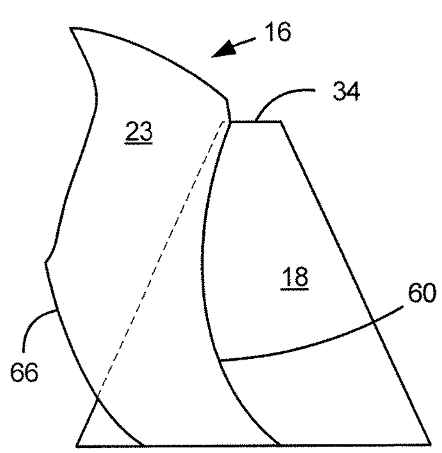
FIG. 4 represents a side view of the blade of FIG. 3.
Figure 5:
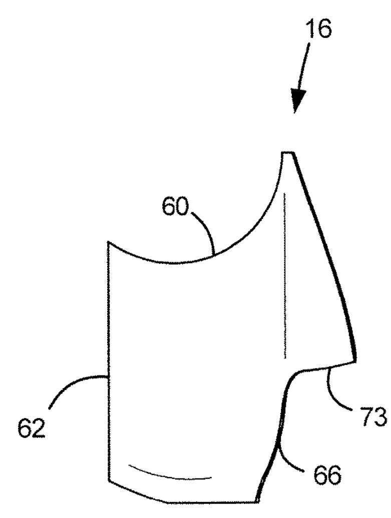
FIG. 5 represents a top view of the blade of FIG. 3.
Figure 6:
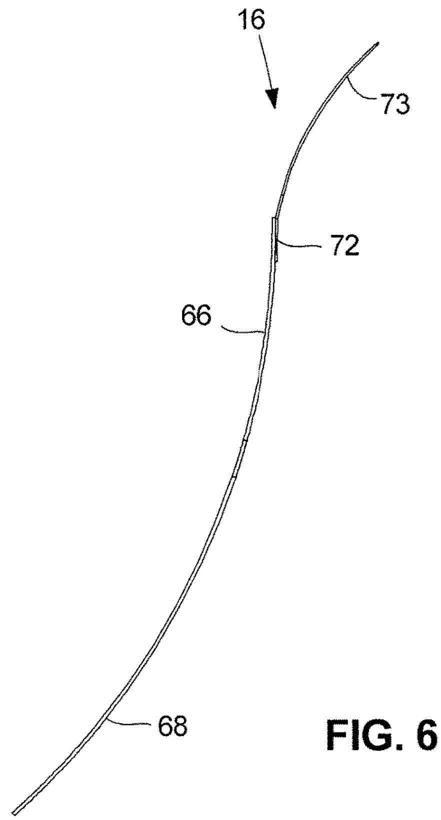
FIG. 6 represents an edge view of the blade of FIG. 3.

Blades 16 are shown in greater detail in FIGS. 3-5. The blades provide a continuous lateral top surface 22 against which incoming airflow 12 pushes to rotate the turbine rotor 14 counterclockwise about its vertical axis A-A. Lateral bottom surface 23 of the blade constitutes the opposite surface from the top surface, and constitutes the leading surface of the blade as it is propelled by air inflow 12.

As shown in FIG. 1, a series of passageways 50 in turbine rotor 14 are defined by the bottom lateral surface 23 of one blade 16, the top lateral surface 22 of the adjacent blade 16, base plate 30, and the portion 18 of solid center core 32 exposed between the adjacent blades 16. An inlet window 52 is provided by the area bounded by these adjacent blades 16, the base plate 30, and below the bottom edge of upper housing 36. Because of solid center core 32, the inlet airflow 12 entering passageway 50 through inlet window 52 in turbine rotor 14 cannot pass through the turbine rotor and exit through the opposite side, as is possible with some prior art turbine rotors. Thus, the inlet air flow 12 must interact with the top surface 22 of the blades 16, which enhances the efficiency of the fluid flow turbine 10 of the present invention for converting the kinetic energy of the inlet fluid flow into rotational mechanical energy of the turbine rotor.

The inner edge 60 of blade 16 is attached to the outer wall of solid center core 32. This can be done by any suitable means like welding. The bottom edge 62 of the blade is connected to base plate 30 by, e.g., welding. The outer edge 64 of blade 16 is exposed along its lower portion in the open region 52 between upper housing 36 and base plate 30. The upper portion of the outer edge 64 of blade 16 is contained inside upper housing 36. This upper portion of the outer blade edge 64 may be connected, e.g, by welding to the interior surface of the upper housing 36. In this manner, the blade is held in proper position by means of solid center core 18, base plate 30, and optionally upper housing 36. This enhanced structural support is useful in cases of very high-speed winds.

Unlike some turbine rotors that feature blades that have a straight edge (vertical or angled) with respect to the base plate 30, the blades 16 of the turbine rotor 14 of the present invention feature an outer edge 64 defined by a continuous sinuous curve 66. The lower portion 68 of the outer edge 64 is gradually upwardly curved. This geometry produces a concave region 70 within the lower top surface 22 of the blade 16. Meanwhile, the upper portion 72 of the outer edge 64 of blade 16 is gradually curved in a lateral direction (73) that tails off to the side. This geometry produces a convex region 74 within the upper top surface 22 of the blade.

In operation, the incoming air flow 12 will enter the fluid flow turbine 10 via window 52 of the turbine rotor 14. Travelling through passageway 52, it will strike the top surface 22 of the blade 16, pushing against the blade to rotate the turbine rotor 14 about its axis A-A in a counterclockwise direction. Vertical shaft or rod 20 is attached to the turbine rotor 14 so that it likewise is rotated in the counterclockwise direction. This resulting mechanical rotational energy is transferred to generator 26 via the shaft or rod 20 to produce the electricity 28.

At the same time, the concave region 70 within blade 16 will cup the incoming air flow, and lift it along the length of lower portion 68 of the blade so that the air flow is redirected in a vertical direction so that it can safely exit the turbine rotor 14 through outlet port 42 (see path B-B in FIG. 3). Meanwhile, the convex region 74 within the upper portion 72 of the blade ensures that the top surface 22 of the blade will not continue to redirect the flow of the air stream at the point where the upper portion of the blade edge 64 tails off laterally. This geometry ensures that the air stream can maintain its vertical path as it nears the exit port 42. Without this convex region 74, the air flow might continue to be redirected back upon itself as shown by path C-C in FIG. 3. This doubled back air stream would come into contact with the incoming horizontal air stream, thereby causing unwanted turbulence inside the turbine rotor 14. This turbulence would significantly reduce the efficiency of the fluid flow turbine 10.

For gaseous fluids, the angle $\beta$ (see FIG. 3) between the base plate 30 and the lower portion 68 of the bottom lateral surface 23 of each of the blades 16 is preferably about 55-58 degrees, more preferably about 56-57 degrees. For liquid fluids, this angle $\beta$ is preferably about 42-60 degrees, more preferably about 56-57 degrees. This angle $\beta$ defines the upward slope of the lower portion 68 of the outer blade edges 64 and therefore the degree of upward lift provided by the concave region of 70 of the rotating blades 16 to the gaseous or liquid fluid 12 flowing inside the turbine rotor 14.

Meanwhile, angle $\Delta$ (see FIG. 3) between the upper portion 72 of the bottom lateral surface 23 of each of the blades 16 and the tailed off lateral surface portion 73 is preferably about 100-179 degrees, more preferably about 120-160 degrees, even more preferably about 149 degrees. This angle $\Delta$ defines the tailed off lateral surface portion 73 of upper portion 72 of the blades and therefore the degree of the convex region 74 of the blades that permit the fluid flow 12 to continue to flow substantially vertically from the interior of the turbine rotor 14 through outlet vent 26 (pathway B-B), instead of doubling back upon itself (pathway C-C).

At the same time, the angle $\gamma$ at which the blades 16 are positioned with respect to the base plate 30 is important. The blades are not positioned so that their bottom edges 62 lie along a radius r extending from the center point C of the base plate to its circumference (see FIG. 1). Instead, the bottom edge 62 of each blade 16 lies along a chord CH across the base plate 30 at angle $\gamma$ with respect to radius r. This angle $\gamma$ is preferably about 0-20 degrees, more preferably about 5-15 degrees, even more preferably about 12-13 degrees. By canting the blade 16 towards the incoming fluid flow 12 and away from its conventional radius position, the blades more efficiently catch the incoming fluid flow as it enters the turbine rotor 14 to rotate the blades 16 and redirect the flow of the fluid 12 from a substantially horizontal direction to a substantially vertical direction.

Turbine rotor 14 can comprise different numbers of blades 16, depending upon the nature of fluid flow 12 and other engineering design considerations. Fewer blades reduces the cost to manufacture the turbine rotor. Fewer blades also provide more free area to capture the incoming fluid flow 12. On the other hand, too many blades around the solid center core 32 will tend to block the capture of the fluid flow passing through passageways 50. Too many blades could also increase the weight of the turbine rotor 14, thereby making it difficult to start its rotation by the incoming fluid flow 12. For purposes of the fluid flow turbine 10 of the present invention, 6-20 blades is preferred with 8 blades being more preferred.

Figure 7:
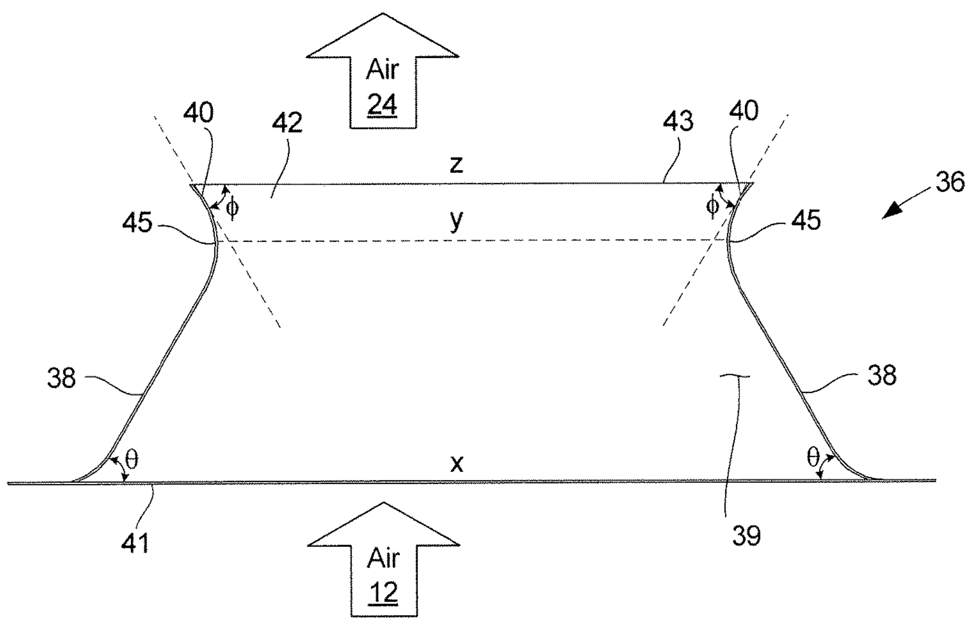
FIG. 7 represents a cut-away view of the upper housing of the turbine rotor.

Another important feature of the fluid flow turbine 10 is the shape of the outer walls 39 of upper housing 36 of turbine rotor 14. As shown in cross section in FIG. 7, outer wall 39 extends between bottom edge 41 and top edge 43 that defines outlet vent 42. The outer wall 39 in turn comprises lower side wall 38 and upper lip 40. In this case, upper lip 40 is flared outwardly, instead of lying in a vertical plane. This geometrical arrangement produces a constriction point 45 around the interior circumference of upper housing 36. Based upon the circular cross-section of upper housing 36 in this invention embodiment, the bottom inlet for fluid 12 flowing upwardly through turbine rotor 14 is defined by an area $A_x$ having a diameter X. At the constriction point 45 of the upper housing 36, however, the area is reduced to $A_y$ having a diameter Y where Y is less than X. But because of the outwardly flared upper lip 40, the outlet vent 42 of the upper housing 36 has an area $A_z$ having a diameter Z where Z is greater than Y.

Employing the well-known "Venturi effect," because fluid 12 (in this case air) is incompressible, the velocity of the fluid flowing upwardly through upper housing 36 will increase as it passes through constriction point 45 in accordance with the principle of mass continuity. At the same time, its static pressure inside the upper housing 36 of turbine rotor 14 must decrease in accordance with the principle of conservation of mechanical energy. Thus, the gain in kinetic energy of the fluid flow due to its increased velocity through the constriction point will be balanced by a drop in pressure.

This Venturi effect will produce higher velocity fluid flow upwardly through turbine rotor 14 accompanied by a reduced pressure condition around outlet vent 42 of upper housing 36 that further enhances the upward fluid flow through the turbine rotor. By enhancing the fluid flow through the turbine rotor in this manner, the transformation of the kinetic energy of the flowing fluid into mechanical energy as the fluid pushes and rotates the multiplicity of blades 16 is made more efficient. This is on top of the efficiencies derived by the upwardly redirected fluid flow path B-B produced by the unique continuously sinous shape of the blade edges 66 in combination with their lower concave regions 70 and upper convex regions 74.

The angle θ between lower side wall 38 and bottom edge 41 of upper housing 36 should be about 45-55 degrees, preferably about 50 degrees. The angle Φ between flared lip wall 40 and top vent edge 42 should be about 35-45 degrees, preferably about 40 degrees. Angles θ and Φ can be the same, such as about 40 degrees. They may also be different with angle Φ exceeding angle θ if it is desired to increase the constriction point 45 inside the upper housing 36 and further reduce the static pressure around the outlet vent 42 to further enhance the upward fluid flow 12 through the turbine rotor. If angle θ=angle Φ at 40 degrees, then area Ay at the convergence point 45 inside the upper housing 36 will converge to 36.3% of area Ax at the inlet to the upper housing. Meanwhile area Az at the outlet of the upper housing will diverge back to 44.4% of the inlet area Ax.

The fluid flow turbine 10 of the present invention should be capable of generating rotor rotational speeds of 180-1000 rpm, preferable 300-600 rpm. By comparison, a conventional General Electric HAWT windmill having 232 foot diameter blades and rated to produce 1.5 MWatts of electricity only rotates at 11-22 rpm.

The parts of the turbine rotor 14 of the present invention may be produced from any suitably strong and weather-resistant material such as mild steel, carbon steel, stainless steel, coated steel, aluminum, or high density polyethylene ("HDPE") plastic. The most commonly available types of carbon steel (mild steel) are ASTM A36 or A572. Stainless steel should preferably be 304L stainless steel. Aluminum material should preferable be 6061 aluminum.

One of the advantages of the turbine rotor 14 of the present invention is that the resulting VAWT fluid flow turbine 10 can be small enough to be installed on top of a building while the conventionally enormous HAWT windmills must stand on the ground, such as in an agricultural field. Thus, the turbine rotor 14 may be about 45-74 inches in diameter and about 28-46 inches in height.

Figure 8A:
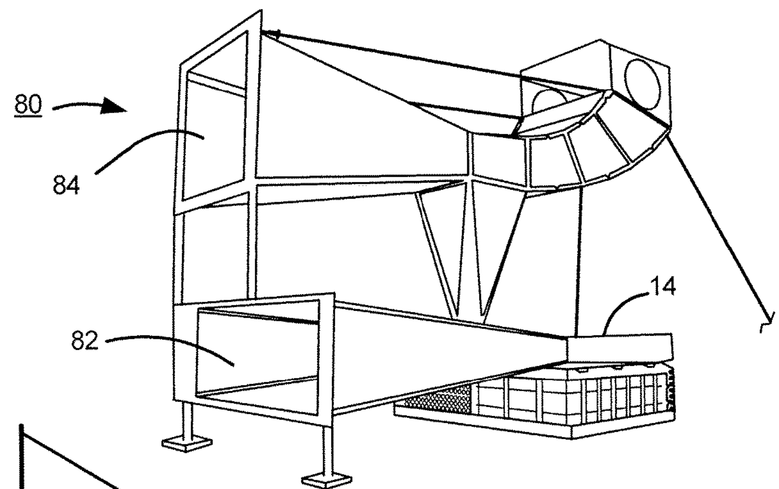
FIGS. 8A and 8B represents a schematic of an improved air flow turbine having an air inflow collector nozzle connected to the inlets of the turbine rotor, along with a passive outflow nozzle connected to the outlet vent of the turbine rotor.
Figure 8B:
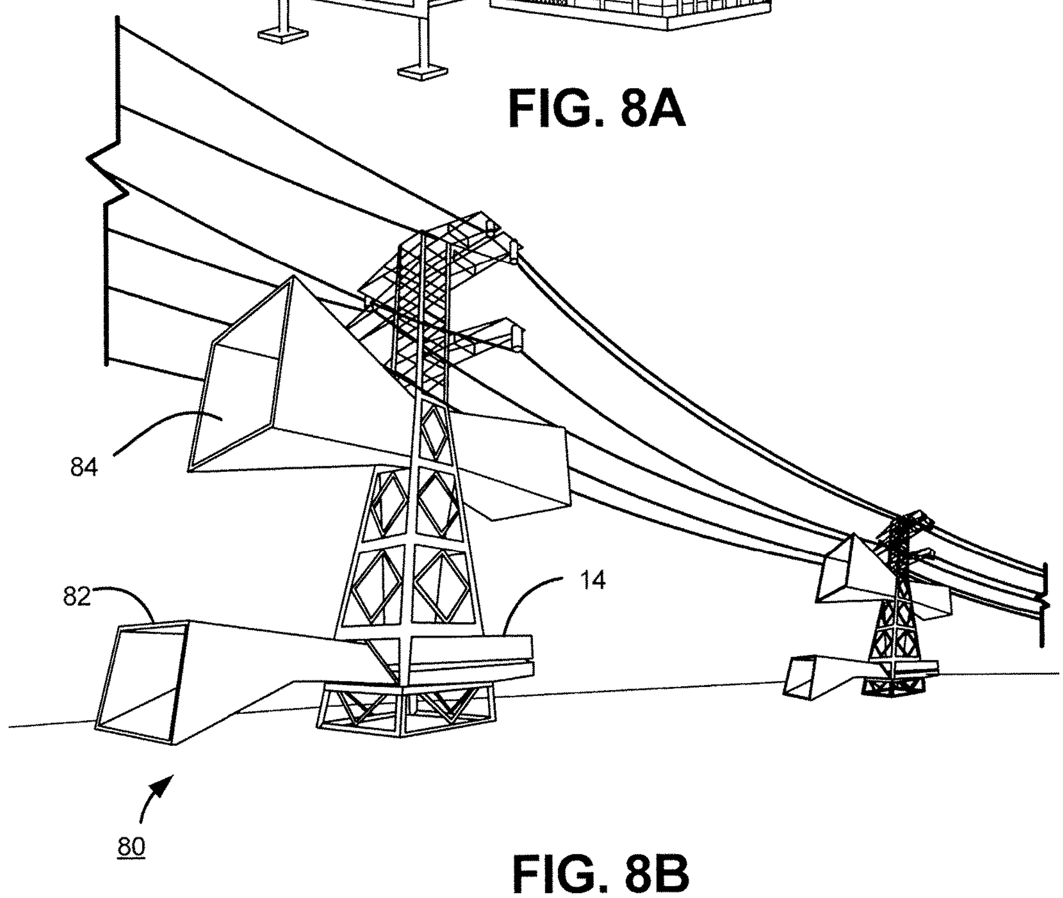

In a preferred embodiment of the fluid flow turbine 80 of the present invention, as shown in FIG. 8, an air inflow collector nozzle 82 comprising an aerodynamic Venturi-type dual intake flow system for creating acceleration of the flowing air 12 may be coupled to the inlet windows 52 of the turbine rotor 14. This will produce an accelerated air inflow to the turbine rotor 14 to increase the rotational speed of the rotor as the accelerated air inflow 12 strikes the top lateral surface of the blades 16.

Meanwhile, a passive inflow nozzle 84 with aerodynamic airfoil configuration may be coupled to the outlet vent 42 of the turbine rotor 14. This type of nozzle will engage higher-altitude, higher-velocity flowing winds above the fluid flow turbine 10 to produce a low-pressure condition within the outlet region of the turbine rotor. This feature will create an updraft to help evacuate the wind flow from the turbine rotor 14 after it strikes the blades 16 and is redirected by the continuously sinuous curved shape of the blade edge into a vertical outflow.

This air inflow collector nozzle 82 and passive inflow nozzle 84 in combination with the continuously sinuous shape of the blades contained inside the turbine rotor 14 and Venturi shape of the upper housing 36 of the turbine rotor 14 combine to accelerate the flow of air through the turbine rotor, reduce turbulence inside the turbine rotor, and increase the rotational speed of the vertical shaft 20 that is connected to the turbine rotor 14. The faster rotation speed of the shaft 20 will result in increased production of electricity by generator 26 relative to the airflow speed of the incoming wind 12.

Example 1

IAP, Inc., the assignee of the present Application, partnered with HEWS Technologies ("HEWS") to produce and test the improved wind turbine 80 of FIG. 8, as described above. HEWS provided the design for the air inflow collector nozzle 82 that was connected to the inlet windows 52 of IAP's turbine rotor shown in FIGS. 1-7. HEWS also provided the design for the passive inflow nozzle 84 that was connected to the outlet vent 42 of the turbine rotor 14. The wind flow turbine 80 was operatively connected to a generator for producing 5 kilowatts of power under optimal conditions. Five kilowatts is equivalent to 6.7 horsepower. The turbine rotor 14 incorporated into the air flow turbine 10 contained eight blades 16. The diameter of the base plate 30 was 45 inches. The height of the air turbine rotor was 28 inches. The outlet vent 42 of the upper housing 36 was 31 inches in diameter. The relevant angles for the turbine rotor were:

α: 65.5°
β: 56.5°
Δ: 149°
γ: 12.7°
θ: 50°
Φ: 40°

Figure 9:
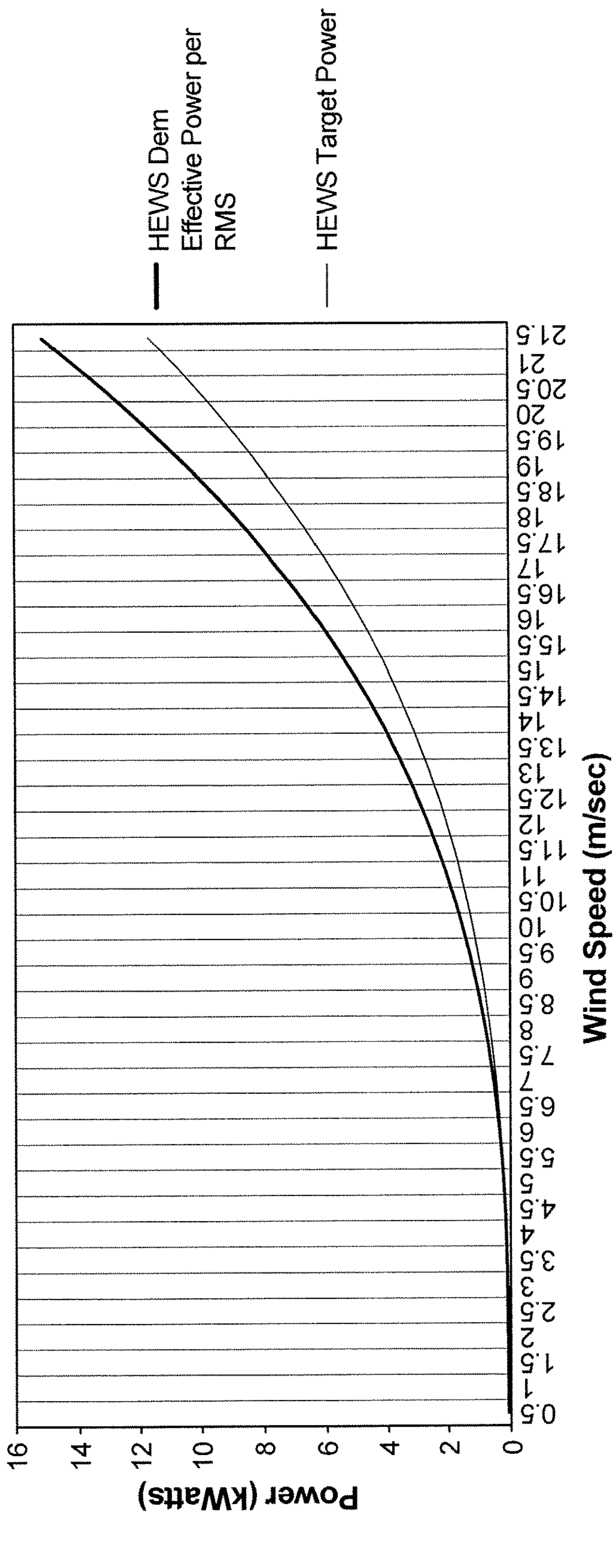
FIG. 9 represents a graphical depiction of the electrical power generated at different wind speeds by the improved air flow turbine 80 of FIGS. 8A and 8B.

Intertek USA of Courtland, N.Y., tested the wind turbine 80 built by IAP at an outdoors location in Tully, N.Y. An anamometer was used to record the prevailing wind speed. The resulting power produced by the wind turbine was also measured. The resulting data points were somewhat scattered because the wind conditions were variable and did not reach high wind speeds on that day that the tests were run. However, a curve was fitted to the measured power output datapoints and extended along the higher wind speed region, employing conventional graphing techniques. This curve for the power produced by the wind turbine 80 at different wind speeds (m/sec) is depicted in FIG. 9.

As can be seen, appreciable levels of electrical power depicted by the HEWS Demo Effective Power per RMS curve was generated by the wind turbine at wind speeds as low as 4 msec. As the wind speed increased, the generated electrical power levels also increased. According to the fitted curve, at 11 m/sec wind speed, approximately 2 kWatts power was produced. This increased to approximately 6 kWatts power at 16 msec wind speed, and approximately 15 kWatts power at 21 msec wind speed. Moreover, the electrical power levels produced by the wind turbine 80 exceeded the theoretical values represented by the HEWS Target Power Curve.

I claim:

1. A fluid flow turbine for generating productive work from a fluid flow, the turbine comprising:

(a) a turbine rotor for transforming kinetic energy of the fluid flow that is flowing into the turbine rotor into mechanical energy, said turbine rotor comprising:
   (i) a base plate having a top surface;
   (ii) an upper housing having an outlet port for venting the fluid flow;
   (iii) a solid conical center core attached to the top surface of the base plate;
   (iv) a plurality of blades, each blade having a bottom edge, an inner edge, an outer edge, and a continuous lateral top surface, the inner edges of the blades being attached to the solid conical center core to radially extend along the base plate from the center core, the outer edges of the blades attached to or being in close proximity to an interior surface of the upper housing, and the outer edge of each blade comprising a continuous sinuous curve;
   (v) a bottom edge of the upper housing being spaced apart from the base plate to form an inlet passage for the fluid flow to enter the turbine rotor in a substantially horizontal direction;

(b) wherein the fluid flow entering the turbine rotor through the inlet passage contacts and pushes against the continuous lateral top surface of each blade to cause the turbine rotor to rotate about a longitudinal axis, the longitudinal axis running through a center of the center core;

(c) wherein the continuous lateral top surface of each blade is defined by the continuous sinuous curve of the outer edge of the blade and the continuous lateral top surface redirects the fluid flow inside the turbine rotor from the substantially horizontal direction to a substantially vertical direction of flow along the blade surfaces to exit the upper housing outlet port; and (d) a device for generating the productive work operatively connected to the rotating turbine rotor, so that the kinetic energy of the fluid flow entering the turbine rotor is converted by the turbine rotor into the mechanical energy which is used by the device for generating the productive work.

2. The fluid flow turbine of claim 1, wherein, for each blade, the continuous lateral top surface that is contacted by the incoming fluid flow comprises a lower portion of the lateral top surface having a concave region, said concave region cupping the incoming fluid flow to lift it along a length of the lower portion of the lateral top surface of the blade to redirect the fluid flow to the substantially vertical direction of flow.

3. The fluid flow turbine of claim 2, wherein an angle between a lateral bottom surface of each blade and the base plate is about 55-58 degrees.

4. The fluid flow turbine of claim 1, wherein, for each blade, the continuous lateral top surface that is contacted by the incoming fluid flow comprises an upper portion of the lateral top surface having a convex region that causes the upper portion of the blade to tail off in a lateral direction, said convex region of each blade enhancing the substantially vertical direction of the fluid flow traveling through the upper housing outlet port of the turbine rotor.

5. The fluid flow turbine of claim 4, wherein, for each blade, an angle between an upper portion of a bottom lateral surface of the blade and a tailed off lateral surface of the blade is about 100-179 degrees.

6. The fluid flow turbine of claim 1, wherein an angle between a sidewall of the solid conical center core for supporting the inner edge of each blade and the base plate is about 64-67 degrees.

7. The fluid flow turbine of claim 1, wherein the bottom edge of each blade is secured to the base plate along a chord defined across the top surface of the base plate, one end of the chord meeting at a point along a peripheral edge of the base plate common with a radius line extending through a center point on the base plate, and an angle between the chord and the radius line being about 0-20 degrees.

8. The fluid flow turbine of claim 1, wherein the upper housing further comprises a bottom edge, a top edge defining the outlet port, and a side wall comprising a lower side wall and an upper lip, the lower side wall being angled with respect to the bottom edge of the upper housing to yield a smaller cross-sectional area at a point where the lower side wall joins the upper lip compared with a cross-sectional area of the upper housing at the bottom edge to produce a constriction point for increasing a velocity of the fluid flow traveling in the substantially vertical direction through the upper housing.

9. The fluid flow turbine of claim 8, wherein an angle between the lower side wall and the bottom edge of the upper housing is about 45-55 degrees.

10. The fluid flow turbine of claim 8, wherein an angle between the upper lip and the top edge of the upper housing is about 35-45 degrees.

11. The fluid flow turbine of claim 1, wherein the plurality of blades of the turbine rotor is about 6-20 in number.

12. The fluid flow turbine of claim 1, wherein the turbine rotor of the fluid flow turbine is rotated by the incoming fluid flow pushing against the blades at rotational speeds of about 180-1000 rpm.

13. The fluid flow turbine of claim 1, wherein the turbine rotor is about 45-74 inches in diameter.

14. The fluid flow turbine of claim 1, wherein the turbine rotor is about 28-46 inches in height.

15. The fluid flow turbine of claim 1 further comprising a Venturi-type dual intake fluid flow inflow collector nozzle connected to the inlet passage of the turbine rotor to accelerate the fluid flow as it enters the turbine rotor.

16. The fluid flow turbine of claim 1 further comprising a passive inflow nozzle with an aerodynamic airfoil configuration connected to the outlet port of the turbine rotor to produce a low-pressure condition within a region proximal to the outlet port of the turbine rotor to enhance the fluid flow through the turbine rotor.

17. The fluid flow turbine of claim 1, wherein a source of the fluid flow comprises a moving gas or liquid stream existing in nature or an industrial process, including a gaseous stream in the form of moving wind in the air, or a moving gaseous effluent like flue gas, process steam, combusted hydroxides, nitrous oxides, or sulfur oxides produced by a combustion process in an industrial plant, or a liquid stream in the form of water flow in a river or ocean, or over a waterfall, or a cooling tower coolant at a power plant.

18. The fluid flow turbine of claim 1, wherein the productive work comprises an industrial process for producing a useful product such as electricity via a generator; ground cereal grains or other granular organic or inorganic materials like biomass to reduce their particle size; or directed air streams for pneumatic conveyance of powders, dust, sawdust, woodchips, or other particles.

19. The fluid flow turbine of claim 1, wherein the fluid flow comprises wind, the productive work comprises electricity generation, and the device for generating the productive work comprises a wind turbine which produces about 2 kilowatts of power at a wind speed of about 11 meters per second.

* * * * *